United States Patent [19]

Tallman

[11] Patent Number: 4,702,786
[45] Date of Patent: Oct. 27, 1987

[54] SIGN SANDBLASTING METHOD

[76] Inventor: Gary C. Tallman, P.O. Box 4, Whitefish, Mont. 59937

[21] Appl. No.: 914,180

[22] Filed: Oct. 1, 1986

[51] Int. Cl.$^4$ .................. B32B 31/12; B32B 31/22; B44C 1/18; G09F 7/12
[52] U.S. Cl. .................................. 156/154; 156/230; 156/289; 156/299; 156/344; 427/143; 427/264; 427/272; 428/187; 428/542.2; 428/913.3; 51/310; 40/596; 40/615
[58] Field of Search ............... 156/153, 154, 230, 241, 156/233, 289–659.1, 344, 299; 40/615, 616, 596; 427/264, 143, 272; 428/187, 542.2, 913.3; 51/310, 311

[56] References Cited

U.S. PATENT DOCUMENTS

| | | | |
|---|---|---|---|
| 2,162,332 | 6/1939 | Frick | 428/40 |
| 3,179,729 | 4/1965 | Richardson | 156/153 |
| 4,133,919 | 1/1979 | Parsons | 427/259 |
| 4,512,839 | 4/1985 | Gerber | 156/248 |

Primary Examiner—Donald E. Czaja
Assistant Examiner—Lori Cuervo
Attorney, Agent, or Firm—Diller, Ramik & Wight

[57] ABSTRACT

This disclosure relates to a method of manufacturing a sign or similar article by providing a wooden substrate having an upper surface; providing a laminate formed by several plies including a ply of sandblast-resistant material, an adhesive, a ply of vinyl, another adhesive and a carrier ply; cutting the laminate to form a template of a desired configuration and applying the template to the upper surface of the substrate, sandblasting the upper surface of the substrate which removes an upper surface strata thereof which is exposed to the sandblast material while unexposed surface strata is uneffected, and thereafter removing the sandblast-resistant ply from the vinyl ply forms a permanent upper covering/indicia/design atop the selected area of the substrate unaffected by the sandblast material.

32 Claims, 4 Drawing Figures

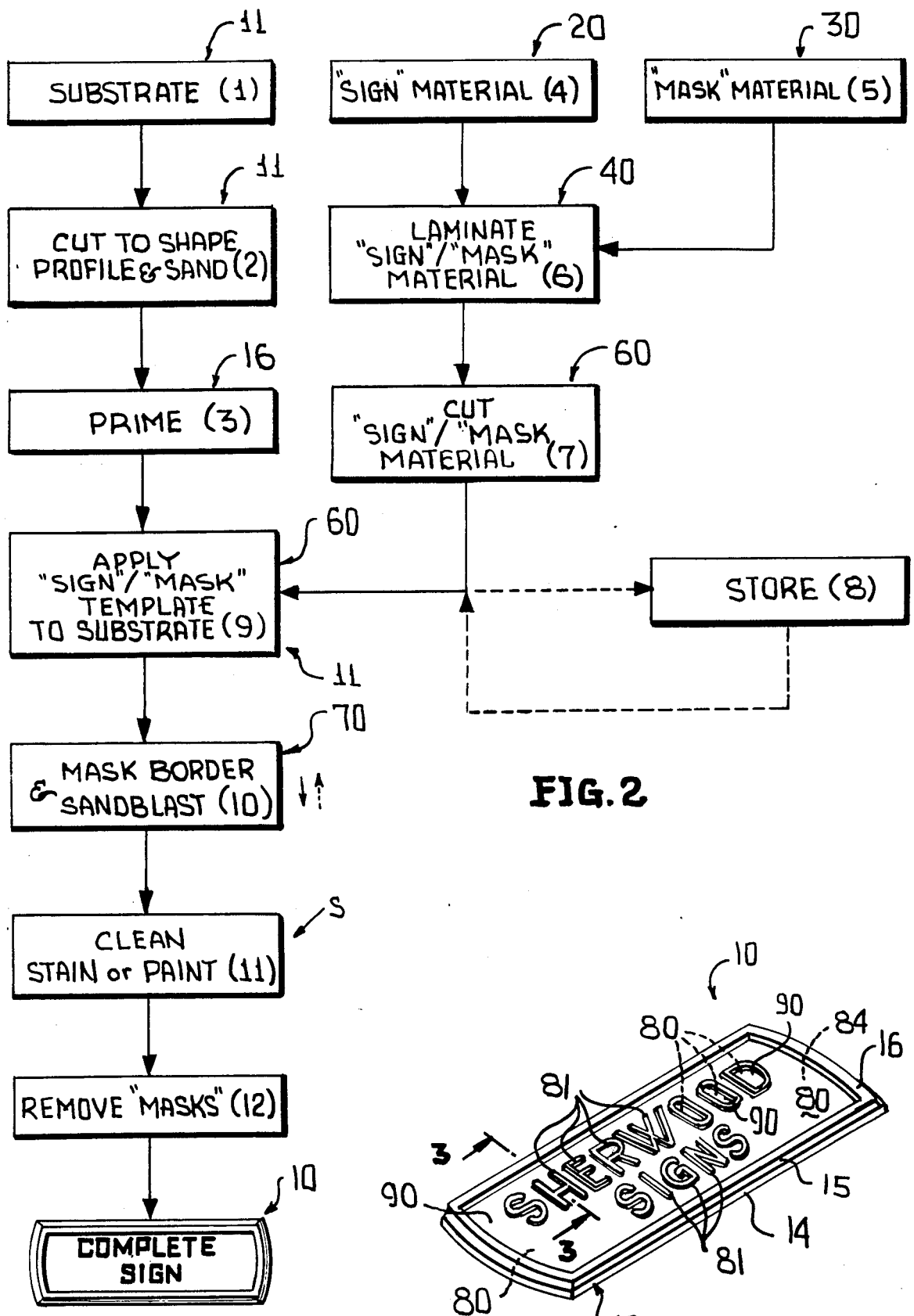

SIGN SANDBLASTING METHOD

BACKGROUND OF THE INVENTION

The invention is directed to a novel method of forming sandblasted signs which heretofore has been done simply by placing a template of resist material of a desired design over a flat wood surface, and sandblasting the surface thereby transforming the desired design to the sign. As an example of the latter, if one wished to sandblast a wooden sign under the known methods, a template could be used, and the unprotected or unshielded portion of the wooden sign would be etched by sandblast material (sand particles, etc.) The lettering would be "raised," or "recessed," depending upon the nature of the template. After the sandblasting operation the upper flat surfaces of the "raised" letters might, for example, be painted a particular color and in this way the lettering would stand-out from the overall sign. This is one method currently in use but it is time-consuming from the standpoint of painting the letters after the sign has been completed, and if the painting is inaccurate the sign looses its quality and "professional" appearance.

An alternative to post-painting a sign is to pre-paint or stain, prior to sandblasting, the portion of the sign to be preserved in its original flat surface configuration. Therefore, though pre-painting followed by sandblasting is a quicker approach to manufacturing a sandblasted sign, it remains a slow and costly portion of the process, and it suffers from appearing "unprofessional". Additionally, in most cases in which the wood is pre-stained or pre-painted it is necessary to pre-stain or pre-paint each area with its respective color if multicolors are to be used. An example of this might be a person's name having lettering of one color and the address having numbers and letters of a different color. This is proportionally slower and more costly than single color and/or post-painted sandblasted sign manufacture.

SUMMARY OF THE INVENTION

The present invention provides a novel method of manufacturing a wooden sign by sandblasting, but the disadvantages of conventional sandblasting techniques and the undesired effects created thereby are completely avoided through a novel template formed from a relatively flexible sheet material laminate. The sheet material laminate is formed of at least one ply which is resistant to sandblast material and another ply (vinyl or equivalent material) which eventually forms a permanent part of the sign. This laminate is cut to form a "sign"/"mask" template of a particular configuration, which can be one or several letters, numbers, designs, logos, or the like. The template is placed upon the surface of a wooden substrate which is to be sandblasted, and when sandblasted, the surface of the substrate which is exposed to the sandblast material is conventionally removed thereby. However, the surface of the substrate which is covered by the "sign"/"mask" template is completely unaffected by the sandblast material and, hence, whatever might be its peripheral profile/outline is created in relief (raised). At the completion of the sandblasting operation, the "mask" ply is removed exposing the "sign" ply of vinyl or similar material which forms a permanent part of the sign. In this fashion the accurately cut "sign" material/ply/logo/design is totally unaffected by the sandblasting material, and when the "mask" ply is removed, the retained "sign" ply presents an extremely professional appearance thereby creating an exceptionally professionally looking sign.

In further accordance with this invention, the sandblasting operation can be followed by a staining or painting operation prior to the removal of the "mask" ply, and in this fashion the exposed sandblasted area can be painted or stained a color different from that of the "sign" ply. However, since this staining or painting takes place while ILLEGIBLE "sign" ply is covered by the "mask" ply, the "sign" ply can not be adversely affected by the staining or painting operation. Thus, when the "mask" ply is removed after the stain or paint has been dried, there is again a clear line of demarcation between the "mask" ply/lettering/ornamentation/logo/design and the stain or paint adjoining the same.

In further accordance with this invention, it is also desirable to place a lacquer, paint or similar prime coat upon the wooden substrate before applying the "sign"/"mask" template thereto through a suitable adhesive. The purpose of the lacquer or prime coat is to create a strong bonding action between the "sign" ply and the primed surface of the wooden substrate.

Still another object of this invention is to provide a novel method as aforesaid wherein the substrate is preferably cut to shape, profiled as desired, sanded and stained before being primed. In this case, a border mask can be applied prior to the sandblasting operation and simultaneously with the sandblasting of the sign through the "sign"/"mask" template, the area covered by the border mask is not sandblasted and, thus, the border of the sign will have a stained appearance, irrespective of the particular color of the "mask" ply/lettering/numbering/logo/design or the staining or painting applied after the sandblasting but before the removal of the "sign"/"mask" template. In this fashion, a sign can be created such that its periphery might be a dark stain (or simply a natural color) carrying the clear prime coat, a lettering of one color on one line, lettering/numbering of another color on another line, and still another color forming the background between all of the lettering and the stained or natural border or profile.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a perspective view of a sign constructed in accordance with the method of this invention, and illustrates raised or relieved letters and a raised or relieved border created when the areas between the same are sandblasted, and the letters each having adhered thereto an overlying "sign" ply corresponding exactly in size and shape to the underlying unsandblasted letters.

FIG. 2 is a flow diagram of the process of this invention, and illustrates graphically the manner in which "sign" and "mask" materials are utilized to form a template which is eventually cut, applied to a wooden substrate and sandblasted to form the sign of FIG. 1.

DESCRIPTION OF THE PREFERRED EMBODIMENTS

Figure 3:
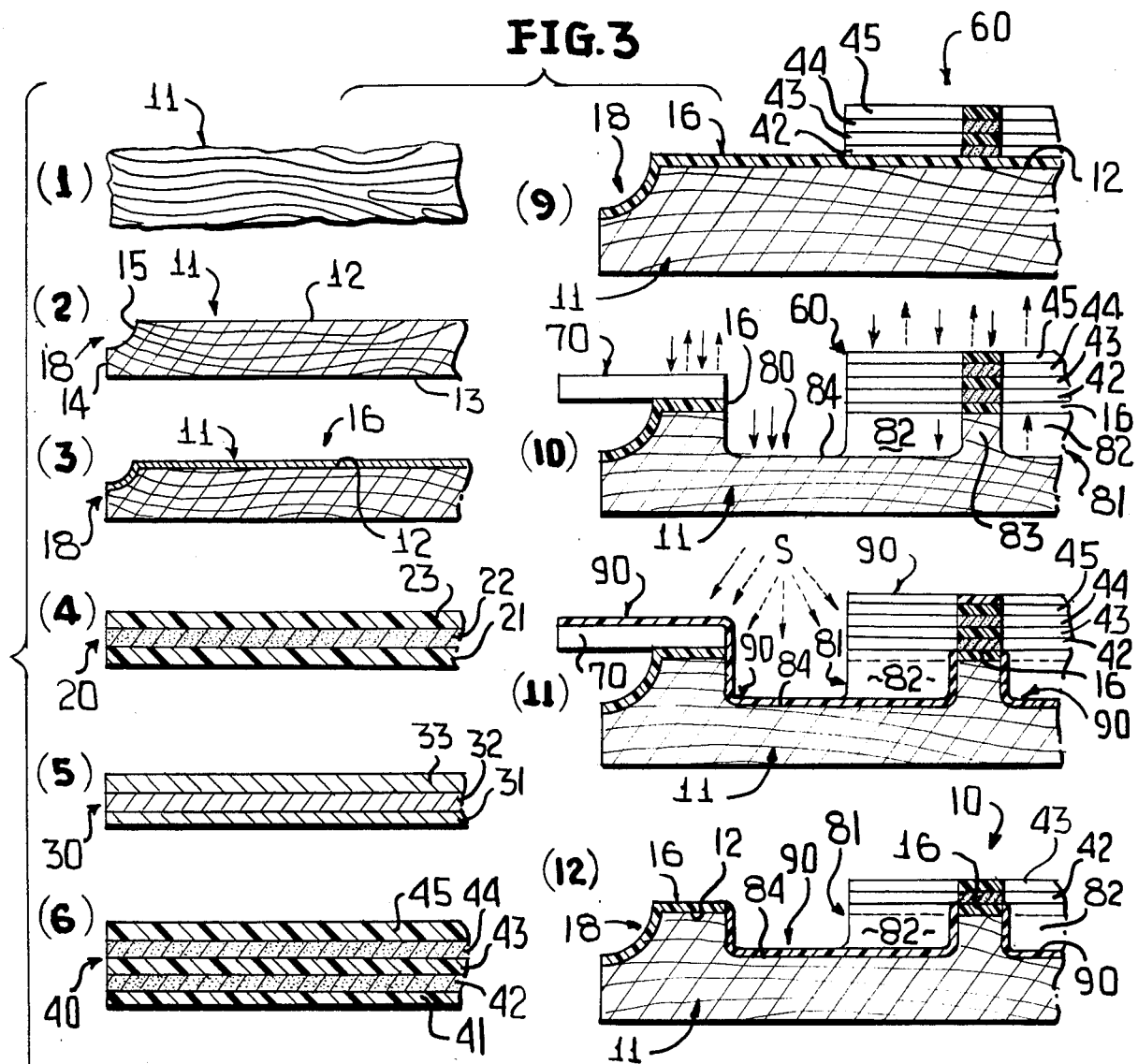
FIG. 3 is an enlarged fragmentary sectional view taken generally along line 3—3 of FIG. 1 during the stages of the formation of the sign with the numbers of FIG. 3 corresponding to the numbers applied to the steps of FIG. 1.

The method of this invention is that of manufacturing an article from most any type of material, but specifically that of manufacturing a sing 10 (FIG. 1) from a substrate 11 (FIG. 3) of wood or the like. The wood substrate 11 is simply a piece of wood of a relatively irregular size, shape, profile and surface configuration which is then preferably cut to a desired shape, profiled if desired, and sanded to include, for example, an upper relatively smooth and flat sanded surface 12 (FIG. 3), a lower smooth sanded surface 13, a relatively smooth sanded peripheral edge 14 and a profiled or grooved radius or channel 15 which collectively define a peripheral border 18.

At this point in the method of manufacturing the sign 10, the upper surface 12, the radius or channel 15 and the edge 14 can, if desired, be stained and/or painted. This is entirely optional and will be discussed further hereinafter, but the remainder of this description of the preferred embodiment of this invention will be done with the assumption that the wood substrate or blank 11 is in its natural state.

The next step in the process is also optional, though preferred, namely, that of applying by a brush, spray, roller or the like a thin coating of any type of material which would increase the bond strength between the upper surface 12 of the substrate 11 and the laminate which will be applied thereto, as will be described hereinafter. However, the material is basically a thin coat of conventional automotive acrylic lacquer, and the coating is generally designated by the reference numeral 16 (See FIG. 3-3).

Figure 4:
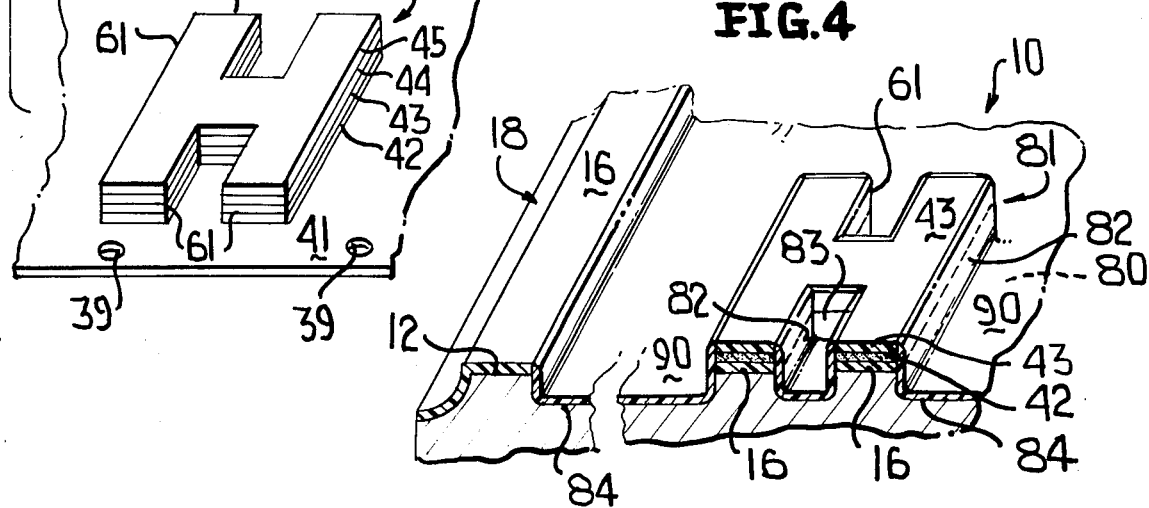
FIG. 4 is an enlarged perspective view of the area of the sign of FIG. 1 forming the letter "II", and exemplifies the manner in which a vinyl layer is adhesively bonded to an underlying portion of the sign formed by sandblasting.

A laminate 20 (FIG. 3-4) of "sign" material is constructed from three plies, namely, a paper, paper stock, or plastic carrier ply 21, an adhesive ply 22 and a ply of conventional vinyl sign material 23. The laminate 20 is of a conventional construction and the paper carrier 21 thereof has opposite edges (not shown) which are perforated for feeding the laminate 20 through a conventional laminate cutting machine, such as the GRAPHIX 4 manufactured by Gerber Scientific Products, Inc. of 151 Batson Drive, Manchester, CT 06040. The GRAPHIX 4 machine has a keyboard which is manipulated to cut, for example, from the vinyl ply 23 letters, designs, etc. which are then simply peeled there from by simultaneously removing both the vinyl and adhesive 23, 22, respectively, from the paper carrier 21. This now-cut letter, number, logo, "sign" 23, 22 is then simply adhered to the surface of an article by placing the adhesive ply 22 there-against. When a series of such vinyl/adhesive letters 22, 23 are applied to a substrate, they can, for example, form a name, describe the name of a service, its location, its telephone number, etc., as is conventionally seen by vinyl lettering or signs applied to the exterior door panels of trucks and automobiles. However, in accordance with this invention, the "sign" material or laminate 20 is not utilized in the conventional fashion just described, as will be noted hereinafter.

Another laminate (FIG. 3-5) is generally designated by the reference numeral 30 and is a conventional "mask" material or laminate which is normally used in sandblasting operations. The "mask" material or laminate 30 includes the paper or plastic carrier ply 31, an adhesive ply 32 and a "mask" ply 33 formed of relatively tough plastic material which is resistant to sand or like particulate material used in a conventional "sandblasting" operation. The conventional carrier 31 is also provided with a series of perforations along opposite longitudinal edges (not shown) and these are utilized for feeding into a conventional computer-controlled cutting machine, such as the GRAPHIX 4 machine heretofore noted, from which letters, numbers, designs, logos, etc. are struck from the plies 32, 33. These "mask" materials are then conventionally applied to the surface of a substrate which is to be sandblasted, the substrate is sandblasted, the underlying areas of the "mask" 32, 33 are unaffected during the sandblasting operation, and thereafter the laminate 33, 32 is removed at the completion of the sandblasting operation.

From the foregoing, it should be particularly noted that the "sign" laminate 20 is conventionally used in the sign-making industry to make vinyl signs and the "mask" laminate 30 is conventionally used in another aspect of the sign-making industry to make sandblasted signs.

In accordance with the present invention neither conventional laminates 20, 30 is used in its "normal" or "conventional" manner, but instead the latter laminates are formed into a composite laminate 40 (FIG. 3-6). The laminate 40 is termed a "sign"/"mask" laminate or template since it includes characteristics of the laminates 20, 30. The "sign"/"mask" template 40 includes a carrier ply 41 constructed of paper or plastic material which has perforations 39 along edges thereof (FIG. 3-7) for feeding purposes, an adhesive ply 42, a ply 43 of "sign" material, such as the conventional vinyl sign material 23 of the laminate 20, an adhesive ply 44, and a ply 45 of sandblasting-resistant "mask" material, such as the conventional sandblast-resistant ply 33 of the conventional laminate 30.

The "sign"/"mask" laminate 40 formed of the plies 41–45 (FIG. 3-5) is provided in sheet or roll form (not shown), and in accordance with the invention the laminate 40 is fed into a GRAPHIX 4 machine or an equivalent computer controlled machine that is operated to cut a "sign"/"mask" template 60 (FIG. 3-7) from the plies 42 through 45 without, of course, cutting the plastic or paper carrier ply 41. As an example, it is assumed that the sign 10 of FIG. 1 is to bear the words "SHERWOOD SIGNS" with each individual letter being in relief surrounded by sandblasted areas. Each of the letters of the words "SHERWOOD SIGNS" are individually computer (or manually) cut from the "sign"/'mask" laminate 40 to form one or more of a series of "sign"/"mask" templates 60, one such template 60 of the letter "H" being illustrated in FIG. 3 7. The letter "H" has been selected simply for purposes of illustration, but it is to be understood that each of the remaining letters are similarly cut from the "sign"/"mask" laminate 40 to form individual templates 60 adhered by the adhesive ply 42 to the carrier ply 41. Furthermore, the template 60 of FIG. 3-7 is illustrated after the material of the laminate 40 bounding a peripheral cut edge 61 of the laminate 60 has been removed from the carrier ply 41.

For the purpose of this description, it will be assumed that not only the template 60 of FIG. 3-7 but a template 60 for each of the remaining letters of the word "SHERWOOD" are cut successively from the same "sign"/"mask" laminate 40 and this is done successively simply by typing on the keyboard of the computer-controlled GRAPHIX 4 machine heretofore described. Therefore, after the cutting operation has been completed and after the material surrounding each template 60 has been removed, there are eight templates 60 on the carrier 41, one template 60 each for the letters "S-H-E-R W-O-O-D" (FIG. 1). Furthermore, it will be assumed that the vinyl ply 43 of the "sign"/"mask" laminate 40 which is so cut to form each template 60 for the word "SHERWOOD" is white in color. It will also be assumed that the individual templates 60 for the letters of the word "SIGNS" (FIG. 1) is similarly/successively cut from another "sign"/"mask" laminate 40 having a yellow colored vinyl ply 43.

The next step (FIG. 2-9) is that of applying the "sign"/"mask" templates 60 to the upper surface 12 of the substrate 11, particularly upon the prime coating 16 thereof, as is shown in FIG. 3-9 of the drawings. The letter "H" is partially shown in FIG. 3-9, but, obviously, each template 60 for each letter in the word "SHERWOOD" is placed upon the coating 16 with the adhesive ply 42 in strong bonding contact therewith. Obviously, the carrier ply 41 must first be removed to expose the adhesive ply 42 of each of the templates 60. The bond strength between the adhesive ply 42 and the acrylic lacquer coating 16 is far greater than that which would be achieved between the adhesive ply 42 and the upper uncoated surface of the wooden substrate 11. Each template 60 for the word "SHERWOOD" can, of course, be individually removed from the carrier 41 and placed upon the primed upper surface 12 of the substrate 11, as can the similar templates 60 for the word "SIGNS". However, a temporary carrier, preferably a relatively tacky strip of paper (not shown) is applied across the "mask" plies 45 of the templates 60 for both words "SHERWOOD" and "SIGNS" before the carrier plies 41 are each carefully peeled from the "SHERWOOD" and "SIGN" template 60. Thus, the individual templates 60 for the words "SHERWOOD" and "SIGNS" adhere at each "mask38 ply 45 to the separate temporarily carrier and permit the now exposed adhesive plies 42 of the words to be accurately positioned upon and transferred to the prime coat 16 of the wood substrate 11, as is best illustrated in FIG. 3-9. Once each template 60 is positioned as shown in FIG. 3-9, the temporary carrier (not shown) is carefully removed from the "mask" plies 45.

A mask 70 is then placed about the entire peripheral border 18 of the substrate 11 inboard of the peripheral edge 14 after which the substrate 11 is sandblasted from above in a downward direction, as indicated by the solid headed unnumbered arrows in FIG. 3-10. Obviously, all areas of the substrate 11 which underly the "mask" plies 45 of the templates 60 and the template 70 are unaffected by the sandblasting, and the templates 60, 70 simply deflect the sandblasting material away, as indicated by the dashed headed arrows in FIG. 3-10. Accordingly, as is perhaps best visualized in FIG. 1, as the sandblasting occurs from above, each template 60 and specifically the sandblast-resistant ply 45 thereof deflects the sandblast material away from the underlying portion or sirala of the substrate 11, whereas exposed portions are progressively sandblasted away forming a generally recessed background area 80 (FIG. 1) inboard of the mask 70 and the peripheral border 18 covered thereby and outboard of the peripheral edge 61 of each template 60 as well as within the enclosed areas of the "R", "O", "O" and "D". Therefore, the sandblasting forms relief or raised letters 81 (FIG. 3 10 and FIG. 4) from the substrate 11 underlying each template 60 "spelling-out" the words "SHERWOOD" and "SIGNS" as shown in FIG. 1. In FIG. 3 10, 11, 12 and FIG. 4 the letter "H" is shown with its "legs" being identified at 82, 82 and its "cross bar" being identified at 83. A lowermost surface 84 identifies the bottom of the recessed background area 80 which has been created by the sandblasting until the desired height of each letter 81 has been achieved.

After the sandblasting operation has been completed but before the masks/templates 60, 70 are removed, the sandblasted areas 80 are cleaned by directing a blast of pressurized air thereagainst, or simply utilizing a soft bristled brush. With the recessed background area 80 cleaned and with the mask 60, 70 still in place, a coating 90 of paint, stain or the like is applied to the surface 84 of the recessed area 80, and for the purpose of this discussion it will be assumed that the coating 90 is created by a spray S from a conventional pressurized paint gun containing brown paint. The plastic "mask" plies 43 are, of course, as resistant to and impenetrable by paint and stain as they are to the sandblast material and, thus, the coating 90 of paint will coat upper surfaces (unnumbered) of the masks 60, 70 (FIG. 3-11) but will penetrate neither and particularly will not penetrate the plies 45 of the templates or masks 60. Thus, when the border mask or template 70 is removed, as shown in FIG. 3-12, the underlying border of the "natural" grain of the substrate 11, which is now the sign 10, is exposed through the preferably thin, clear prime coat of the acrylic lacquer 16. Likewise, the ply 45 of each template 60 is removed at the interface between the adhesive ply 44 and the vinyl ply 43, thereby exposing the vinyl ply 43 atop each letter and adhered thereto through the adhesive ply 42 in bonding engagement with the underlying portion of the prime coating 16. The latter is represented in FIGS. 1, 3-12 and FIG. 4.

Accordingly, as the sign 10 (FIG. 1) is viewed from above, the upper surface 16 of the peripheral border 18 is "natural" and exposed through the clear lacquer prime coating 16 thereatop. Inboard of the border 18, outboard of the peripheral template edges 61 and within the enclosed areas of the "R", "O", "O", and "D" the coating 90 of paint is the dark brown heretofore noted. The raised individual letters of "SHERWOOD" have the white vinyl plies 43 exposed and the raised individual letters of "SIGNS" have the yellow vinyl plies 43 exposed. Hence, in the relatively straightforward and simple manner just described, the sign 10 is accurately, eloquently and professionally created, and though painting or staining is utilized, the latter in no way can adversely affect the eventual professional appearance of the sign due to the novel priming/masking/sandblasting/painting steps constituting the method of this invention.

Reference is once again made to the possibility of staining the substrate 11 between steps 2 and 3 of FIG. 2. If, for example, the entire upper surface 12 of the substrate 11 were stained between steps 2 and 3 of FIG. 2 and thereafter primed with a clear lacquer coating 16, the stain would appear through the coating 16 of the border 18 in the final sign 10. However, in lieu of staining in this step, the entire upper surface 12 of the wood substrate 11 or only the border 18 thereof could be printed yet another color before the clear prime coat 16 were applied thereto. For example, if the upper surface 12 along the periphery were painted red before the clear prime coat 16 were applied thereto, the eventual sign 10 would have a red border, but otherwise the colors will be identical to that heretofore described relative to FIG. 1. This is because any red inboard of the mask 70 is blasted away during the sandblasting operation, and any remaining red which might underlie any of the templates 60 is, obviously, covered by that ply 43 overlying the same, in this case white and yellow plies for the respective words "SHERWOOD" and "SIGNS".

In further accordance with this invention reference is made to FIG. 2, step 7 which was described earlier with respect to FIG. 3-7. In lieu of applying each template 60 directly to the substrate 11 it is another aspect of this invention to manufacture individual templates 60, be they letters, numbers, logos, signs, or the like in a variety of different colors and to keep these stored, as at FIG. 2, step 8. For example, one could offer for sale signs in which the indicia formed thereon by the templates 60 could vary in, for example, size, style and color. The letters "A", "B", "C", etc in different sizes, styles, and colors, and the numbers "0", "1", "2", "3", "9" in different sizes, styles and colors could be pre-cut and stored. If a person then chose to order a sign which read "SHERWOOD" in yellow and "SIGNS" in orange, one would simply go to the storage area, select these templates 60 in the ordered style and color, assemble the same on the substrate 11 and perform the method herein described. This would result in the word "SHERWOOD" of the sign 10 of FIG. 1 being yellow and the word "SIGNS" being orange with, of course, variations in the recessed/background area 80 also being available so as to be compatible with the yellow and orange (gray, for example). However, the important fact is that any variety of cut "sign"/"mask" templates 60 of styles, sizes and colors could be maintained in storage (FIG. 2, step 8) for subsequent application to a substrate, as in step 9 of FIG. 2 toward achieving professional signs extremely quickly and, of course, economically.

In accordance with one variation in the method, in lieu of spraying the coating 90 (FIG. 3-11) while the mask/border templates is in place, the template 70 can be removed and the spray S applied. This will apply the coating 90 upon the acrylic lacquer 16 along the peripheral border 18, but this coating can be quickly wiped clean by simply utilizing a rag or a rag with a suitable solvent. Likewise, the spray S can be applied after the sandblasting/resistant "mask" ply 45 and the adhesive ply 44 have been removed, as shown in FIG. 12. If the spray S of paint or coating material 90 is applied downwardly in FIG. 12 against the now-exposed vinyl "sign" ply 43, the upper surface of the latter will be covered. However, the vinyl ply is virtually inpenetratable and again the paint or coating 90 applied thereto can be quickly wiped away with a dry cloth or a cloth carrying an appropriate solvent. Therefore, while in the preferred spray step of FIG. 3 11, the coating material 90 is applied while the border template 70 is in place and the sandblasting-resistant mask ply 45 has not been removed, either or both of the latter can be removed, the spray step S performed to apply the coating 90 upon the lacquer 16 of the border 18 and/or upon the upper surface of the vinyl "sign" ply 43, and in either or both cases the coating 90 is then simply wiped therefrom.

Obviously, the bond strength of the adhesive ply 44 between the plies 45, 43 is less than the bond strength between the ply 43 and the lacquer or prime coat 16 to permit the rapid removal/delamination of the ply 45 from the ply 43 at the interface between the upper surface of the ply 43 and the adhesive 44. In order to further augment this delamination or removal of the resist ply 44, heat can be applied in any suitable fashion to degradate or soften the adhesive ply 44 without, of course, altering the bond of the adhesive ply 42. As an alternative, the adhesive ply 42 can be thermo-setting so that its bond strength will increase during the latter-noted heating step, while the adhesive of the ply 44 is thermo-releasing. Thus, the heating step simultaneously increase the bond strength of the adhesive 42 and weakens the bond strength of the adhesive 44 thereby assuring the delamination/removal heretofore noted.

It is also, of course, possible in keeping with the present invention to form "recessed" instead of "raised" letters, as in the case of the sign 10. In this case instead of applying the templates 60 to the wood substrate 11, the templates 60 can be removed from a single sheet of the composite laminate 40 which would leave "holes" in the sheet corresponding to the words "SHERWOOD" and "SIGNS" of FIG. 1. This composite sheet would then be applied to the substrate and sandblasted as heretofore noted. The sandblasting would, therefore, take place through the letters, not around the letters as first described and, thus, the letters of the words "SHERWOOD" and "SIGNS" would be recessed and not raised. Otherwise, the method is identical to that heretofore described but, of course, the vinyl ply 43 would surround the "recessed" letters upon which the enamel or coating material 90 would be sprayed. Thus, the sign would be essentially the reverse of that described, namely, the letters would be recessed and painted while being surrounded by the vinyl "sign" ply 43 of the composite sheet.

Although a preferred embodiment of the invention has been specifically illustrated and described herein, it is to be understood that minor variations may be made in the method and apparatus without departing from the spirit and scope of the invention, as defined in the appended claims.

I claim:

1. A method of manufacturing an article comprising the steps of providing a substrate having an upper surface; providing a laminate having a peripheral edge of a predetermined profile and including a first ply adapted to become a part of the article and a second ply adapted to protect the first ply during the manufacture of the article; the predetermined profile of the laminate being defined by generally coextensive edges of the first and second plies, securing the first ply to the upper surface of the substrate; directing abrasive material against the second ply and an exposed surface portion of the substrate upper surface whereby the second ply protects the underlying first ply from the abrasive material and the abrasive material removes an upper surface strata of the substrate exposed surface portion without affecting the upper surface strata underlying the first ply, and removing the second ply from the first ply whereby the article includes the first ply in coextensive overlying relationship to the underlying upper surface strata of the substrate.

2. The method as defined in claim 1 wherein the laminate is formed of two flexible sheet material plies.

3. The method as defined in claim 1 wherein the securing step is performed by utilizing an adhesive.

4. The method as defined in claim 1 wherein the laminate is formed of two flexible sheet material plies temporarily laminated to each other by an adhesive, and providing a flexible removable carrier sheet to which the first ply is temporarily adhesively adhered and from which the laminate is stripped incidental to being secured to the substrate upper surface.

5. The method as defined in claim 1 wherein the laminate is formed of two flexible sheet material plies temporarily laminated to each other by an adhesive, and providing a flexible removable carrier sheet to which the second ply is temporarily adhesively adhered and from which the laminate is stripped incidental to being secured to the substrate upper surface.

6. The method of defined in claim 1 wherein the laminate is formed of two flexible sheet material plies temporarily laminated to each other by an adhesive, and providing a pair of flexible removable carrier sheets between which the laminate is sandwiched and from which the laminate is stripped incident to being secured to the substrate upper surface.

7. The method as defined in claim 1 wherein the laminate is formed of two flexible sheet material plies temporarily laminated to each other by an adhesive, and providing a pair of flexible removable carrier sheets between which the laminate is temporarily adhesively sandwiched and from which the laminate is stripped incident to being secured to the substrate upper surface.

8. The method as defined in claim 1 wherein the laminate is formed of two flexible sheet material plies in roll form.

9. The method as defined in claim 1 wherein the laminate is formed of two flexible sheet material plies in roll form temporarily adhesively secured to each other.

10. The method as defined in claim 1 wherein the laminate is formed of two flexible sheet material plies in roll form sandwiched between a pair of flexible webs.

11. The method as defined in claim 1 wherein the laminate is formed of two flexible sheet material plies in roll form temporarily adhesively secured to each other and sandwiched between a pair of flexible webs.

12. The method as defined in claim 1 wherein the laminate is formed of two flexible sheet material plies in roll form temporarily adhesively secured to each other and to at least one of a pair of flexible webs between which the laminate is sandwiched.

13. The method as defined in claim 1 including the stop of temporarily sandwiching the laminate between a pair of flexible covering sheets.

14. The method as defined in claim 1 including the step of temporarily sandwiching the laminate between a pair of flexible covering sheets, and adhesively securing at least one of the laminate plies to one of the covering sheets.

15. The method as defined in claim 1 including the step of temporarily sandwiching the laminate between a pair of flexible covering sheets, and adhesively securing the first and second plies of the laminate to respective first and second of the covering sheets.

16. The method as defined in claim 1 including the step of applying a coating against the substrate from which the upper surface strata had been removed prior to removing the second ply from the first ply.

17. The method as defined in claim 1 including the step of painting the substrate from which the upper surface strata had been removed prior to removing the second ply from the first ply.

18. The method as defined in claim 1 including the step of painting the substrate from which the upper surface strata had been removed after removing the second ply from the first ply, and cleaning any paint from the first ply.

19. The method as defined in claim 1 including the step of heating the second ply prior to performing the removing step to decrease the bond strength of the laminate and thereby facilitate the removal of the second ply.

20. The method as defined in claim 1 including the step of staining the substrate from which the upper surface starta had been removed prior to removing the second ply from the first ply.

21. The method as defined in claim 1 wherein the securing step is performed by utilizing an adhesive, and applying a coating of material to the substrate upper surface before the adhesive securing step to increase the bond between the substrate and the first ply.

22. The method as defined in claim 1 wherein the substrate has a peripheral border, and masking the peripheral border prior to performing the abrasive-directing step whereby the peripheral border upper surface is coplanar with the upper surface strata underlying the first ply after the performance of the abrasive-directing step.

23. The method as defined in claim 1 wherein the substrate is a sign and the first ply includes lettering.

24. The method as defined in claim 1 wherein the laminate peripheral edge is made by first adhesively securing the first and second plies to each other and then simultaneously cutting the coextensive edges of the plies.

25. The method as defined in claim 16 wherein the laminate is formed of two flexible sheet material plies temporaily adhesively secured to each other.

26. The method as defined in claim 25 including the step of applying a coating against the substrate from which the upper surface strata had been removed prior to removing the second ply from the first ply.

27. The method as defined in claim 25 including the step of painting the substrate from which the upper surface strata had been removed prior to removing the second ply from the first ply.

28. The method as defined in claim 25 including the step of staining the substrate from which the upper surface strata had been removed prior to removing the second ply from the first ply.

29. The method as defined in claim 25 wherein the securing step is performed by utilizing an adhesive, and applying a coating of material to the substrate upper surface before the adhesive securing step to increase the bond between the substrate and the first ply.

30. The method as defined in claim 25 wherein the substrate has a peripheral border, and masking the peripheral border prior to performing the abrasive-directing step whereby the peripheral border upper surface is coplanar with the upper surface strata underlying the first ply after the performance of the abrasive-directing step.

31. The method as defined in claim 25 wherein the laminate peripheral edge is made by first adhesively securing the first and second plies to each other and then simultaneously cutting the coextensive edges of the plies.

32. The method as defined in claim 29 wherein the substrate has a peripheral border, and masking the peripheral border prior to performing the abrasive-directing step whereby the peripheral border upper surface is coplanar with the upper surface strata underlying the first ply after the performance of the abrasive-directing step.

* * * * *